United States Patent
Inoue et al.

(10) Patent No.: US 7,420,488 B2
(45) Date of Patent: Sep. 2, 2008

(54) APPARATUS AND METHOD FOR SETTING FILTER COEFFICIENT, AND RECORDING MEDIUM HAVING A PROGRAM RECORDED THEREON

(75) Inventors: Takeo Inoue, Hirakata (JP); Hideki Ohashi, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/672,648

(22) Filed: Feb. 8, 2007

(65) Prior Publication Data

US 2007/0182614 A1    Aug. 9, 2007

(30) Foreign Application Priority Data

Feb. 9, 2006    (JP) .............................. 2006-032540

(51) Int. Cl.
*H03M 1/00*    (2006.01)
(52) U.S. Cl. ....................... 341/110; 341/143; 341/144; 341/155
(58) Field of Classification Search .......... 341/110.144, 341/155, 143
See application file for complete search history.

(56) References Cited

U.S. PATENT DOCUMENTS

| | | | | |
|---|---|---|---|---|
| 5,075,687 A | * | 12/1991 | Chen et al. ................... | 341/110 |
| 5,633,863 A | * | 5/1997 | Gysel et al. .................. | 370/290 |
| 5,818,370 A | * | 10/1998 | Sooch et al. ................. | 341/120 |
| 6,208,279 B1 | * | 3/2001 | Oprescu ...................... | 341/143 |
| 6,215,429 B1 | * | 4/2001 | Fischer et al. ............... | 341/139 |
| 6,313,775 B1 | * | 11/2001 | Lindfors et al. ............. | 341/143 |
| 6,316,778 B1 | * | 11/2001 | Goodman et al. ........... | 250/551 |
| 6,404,357 B1 | * | 6/2002 | Taunton ....................... | 341/61 |
| 6,658,055 B1 | * | 12/2003 | Darr ........................... | 375/232 |
| 6,674,810 B1 | * | 1/2004 | Cheng ......................... | 375/296 |
| 7,173,962 B2 | * | 2/2007 | Dowling ...................... | 375/222 |
| 7,183,954 B1 | * | 2/2007 | Melanson et al. ........... | 341/143 |
| 7,307,565 B1 | * | 12/2007 | Melanson .................... | 341/143 |

FOREIGN PATENT DOCUMENTS

| | | |
|---|---|---|
| DE | 42 02 206 A1 | 7/1993 |
| JP | 61-30134 | 12/1986 |
| JP | 2001-060895 | 3/2001 |

\* cited by examiner

OTHER PUBLICATIONS

European Patent Office, European Search Report; Application No. EP 07 10 1433, Search Report dated Jun. 1, 2007, The Hague.

*Primary Examiner*—Linh V Nguyen
(74) *Attorney, Agent, or Firm*—SoCal IP Law Group LLP; Steven C. Sereboff; John E. Gunther

(57) ABSTRACT

Echo preventing circuit includes first and second FIR filters. The outputs of the first and second FIR filters are converted into first and second analog signals. An input/output terminal outputs the first analog signal or receives a third analog signal. An AD converter converts an analog signal obtained by subtracting the second analog signal from a signal formed by combining the first analog signal and the third analog signal. A response signal acquiring unit acquires a first response signal from an output of the first FIR filter to an output of the AD converter. A filter coefficient setting unit sets the filter coefficients of the second FIR filter based on the first response signal and sets the filter coefficients of the first FIR filter based on second response signal of a section from and output of the second FIR filter to an output of the AD converter.

20 Claims, 8 Drawing Sheets

APPARATUS AND METHOD FOR SETTING FILTER COEFFICIENT, AND RECORDING MEDIUM HAVING A PROGRAM RECORDED THEREON

CROSS-REFERENCE TO RELATED APPLICATION

This application claims the benefit of priority to Japanese Patent Application No. 2006-32540, filed Feb. 9, 2006, of which full contents are incorporated herein by reference.

BACKGROUND OF THE INVENTION

1. Field of the Invention

The present invention relates to a filter coefficient setting apparatus, a filter coefficient setting method, and a recording medium recorded with a program.

2. Description of the Related Art

Recently, for example, each of some communicating apparatuses such as a mobile phone and a hands-free phone that can each be connected to an earphone microphone, incorporates an echo preventing circuit to prevent echoes generated due to sound coupling that travels along from a speaker to a microphone, electric reflection in a circuit, etc. For example, Japanese Patent Application Laid-Open Publication No. 3293029 discloses a circuit that prevents echoes by canceling an input signal using a signal having a phase that is an inverse of that of and the amplitude level equal to that of the input signal. However, the configuration disclosed in the above '029 publication needs to set the circuit constants of the circuit elements with high precision to cancel echoes with high precision. However, such a configuration is not easy and this circuit can not cancel echoes with high precision.

Therefore, a method of canceling echoes with high precision using digital processing is considered. FIG. 8 depicts an example of an echo preventing circuit that uses a DSP 100. As depicted, an analog signal indicating sound transmitted from a counterpart using a mobile phone, etc., is inputted into an AD converter 101. The signal converted into a digital signal by the AD converter 101 is applied with a convoluting process by FIR filters 102 and 103 in the DSP 100 based on the filter coefficients thereof, and is outputted. A signal outputted from the FIR filter 102 is inputted into a DA converter 104. The signal converted into an analog signal by the DA converter 104 is outputted to an earphone microphone through an input/output terminal 105 and is inputted into one of two terminals of a differential amplifying circuit 106. The signal outputted from the FIR filter 103 is inputted into a DA converter 107. The signal outputted from the DA converter 107 is inputted into the other terminal of the differential amplifying circuit 106.

The signal outputted from the differential amplifying circuit 106 is converted into a digital signal by an AD converter 108 and is inputted into the DSP 100. After being outputted from the DSP 100, this digital signal is converted into an analog signal by a DA converter 109 and is outputted as an output signal of the echo preventing circuit.

The DSP 100 acquires an impulse response of a section from the DA converter 104 to the AD converter 108 based on the output of the AD converter 108 obtained when the DSP 100 outputs an impulse to the DA converter 104. The DSP 100 acquires an impulse response of a section from the DA converter 107 to the AD converter 108 based on the output of the AD converter 108 obtained when the DSP 100 outputs an impulse to the DA converter 107. By setting properly the filter coefficients of the FIR filters 102 and 103 based on these impulse responses, echoes can be canceled with high precision.

When the impulse responses are acquired, impulse responses with high precision can not be obtained unless the magnitude of the impulse is proper and, as a result, the echoes can not be canceled effectively. FIGS. 9A to 9C depict examples of impulse responses corresponding to the magnitude of an impulse. As depicted in FIG. 9A, when the magnitude of the impulse is proper, an impulse response having the proper magnitude can be obtained. In contrast, as depicted in FIG. 9B, when the magnitude of the impulse is too small, the signal level of the impulse response is small and the precision of the impulse response is degraded due to background noises, circuit noises, etc. As depicted in FIG. 9C, when the magnitude of the impulse is too large, the impulse response overflows in the AD converter 108 and no accurate impulse response can be obtained.

Therefore, it is necessary to obtain an impulse having the proper magnitude as depicted in FIG. 9A by generating an impulse having a proper magnitude. However, the magnitude of the impulse varies depending on the internal impedance of an earphone microphone used, the sensitivity of a speaker, the sensitivity of a microphone, or dispersion of the resistors used in the differential amplifying circuit 106, etc. caused through manufacture thereof, etc. Therefore, it is difficult to determine in advance the proper magnitude of the impulse. Therefore, when the filter coefficients of the FIR filters 102 and 103 are set based on an impulse response obtained by generating a impulse having a predetermined magnitude, the echoes can not always be canceled effectively.

SUMMARY OF THE INVENTION

It is therefore the object of the present invention to provide a filter coefficient setting apparatus, a filter factor setting method, and a recording medium recorded with a program that can set a proper filter factor to prevent echoes.

In order to achieve the above object, according to a first aspect of the present invention there is provided a filter factor setting apparatus that sets the filter coefficients of an echo preventing circuit, the echo preventing circuit having a first FIR filter that is inputted with a first digital signal and that outputs a second digital signal, a second FIR filter that is inputted with the first digital signal at the same time that the first FIR filter is inputted with the first digital signal, and that outputs a third digital signal, a first DA converter that converts the second digital signal into a first analog signal and outputs the first analog signal, a second DA converter that converts the third digital signal into a second analog signal and outputs the second analog signal, an input/output terminal that outputs the first analog signal or that is inputted with a third analog signal, a subtracting circuit that outputs a fourth analog signal obtained by subtracting the second analog signal from a signal formed by combining the first analog signal and the third analog signal, and an AD converter that converts the analog signal outputted from the subtracting circuit into a digital signal and outputs the digital signal, the apparatus comprising a response signal acquiring unit that acquires a first response signal of a section from an output of the first FIR filter to an output of the AD converter by generating a first signal, adjusts the magnitude of the first signal in response to the magnitude of the first response signal, and acquires again the first response signal; a filter coefficient setting unit that sets the filter coefficients of the second FIR filter based on the first response signal acquired again and sets the filter coefficients of the first FIR filter based on a second response signal of a section from an output of the second FIR filter to an output of the AD converter; and a signal level adjusting unit that adjusts the signal levels of the first and the second analog signals based on the amount by which the level of the first signal is to be adjusted such that the fourth analog signal is a signal obtained by removing or attenuating the first analog signal from a signal formed by combining the first analog signal and the third analog signal.

In order to achieve the above object, according to a second aspect of the present invention there is provided a filter coefficient setting method of an echo preventing circuit, the echo preventing circuit having a first FIR filter that is inputted with a first digital signal and that outputs a second digital signal, a second FIR filter that is inputted with the first digital signal at the same time that the first FIR filter is inputted with the first digital signal, and that outputs a third digital signal, a first DA converter that converts the second digital signal into a first analog signal and outputs the first analog signal, a second DA converter that converts the third digital signal into a second analog signal and outputs the second analog signal, an input/output terminal that outputs the first analog signal or that is inputted with a third analog signal, a subtracting circuit that outputs a fourth analog signal obtained by subtracting the second analog signal from a signal formed by combining the first analog signal and the third analog signal, and an AD converter that converts the analog signal outputted from the subtracting circuit into a digital signal and outputs the digital signal, the method comprising the steps of acquiring a first response signal of a section from an output of the first FIR filter to an output of the AD converter by generating a first signal; adjusting the magnitude of the first signal in response to the magnitude of the first response signal; acquiring again the first response signal; setting the filter coefficients of the second FIR filter based on the first response signal acquired again; setting the filter coefficients of the first FIR filter based on a second response signal of a section from an output of the second FIR filter to an output of the AD converter; and adjusting the signal levels of the first and the second analog signals based on the amount by which the level of the first signal is to be adjusted such that the fourth analog signal is a signal obtained by removing or attenuating the first analog signal from a signal formed by combining the first analog signal and the third analog signal.

In order to achieve the above object, according to a third aspect of the present invention there is provided a recording medium having recorded thereon a program to set filter coefficients of an echo preventing circuit, the echo preventing circuit having a processor, a first FIR filter that is inputted with a first digital signal and that outputs a second digital signal, a second FIR filter that is inputted with the first digital signal at the same time that the first FIR filter is inputted with the first digital signal, and that outputs a third digital signal, a first DA converter that converts the second digital signal into a first analog signal and outputs the first analog signal, a second DA converter that converts the third digital signal into a second analog signal and outputs the second analog signal, an input/output terminal that outputs the first analog signal or that is inputted with a third analog signal, a subtracting circuit that outputs a fourth analog signal obtained by subtracting the second analog signal from a signal formed by combining the first analog signal and the third analog signal, and an AD converter that converts the analog signal outputted from the subtracting circuit into a digital signal and outputs the digital signal, the program being operable to cause the processor to implement the functions of acquiring a first response signal of a section from an output of the first FIR filter to the AD converter by generating a first signal; adjusting the magnitude of the first signal in response to the magnitude of the first response signal and acquiring again the first response signal; setting the filter coefficients of the second FIR filter based on the first response signal acquired again and setting the filter coefficients of the first FIR filter based on a second response signal of a section from an output of the second FIR filter to an output of the AD converter; and adjusting the signal levels of the first and the second analog signals based on the amount by which the level of the first signal is to be adjusted such that the fourth analog signal is a signal obtained by removing or attenuating the first analog signal from a signal formed by combining the first analog signal and the third analog signal.

Other features of the present invention will be clear by referencing the accompanying drawings and the description herein.

BRIEF DESCRIPTION OF THE DRAWINGS

For more thorough understanding of the present invention and the advantages thereof, the following description should be referenced in conjunction with the accompanying drawings, in which.

DETAILED DESCRIPTION OF THE INVENTION

At least the following items will be clear according to the description herein and in the accompanying drawings.

Entire Configuration

Figure 1:
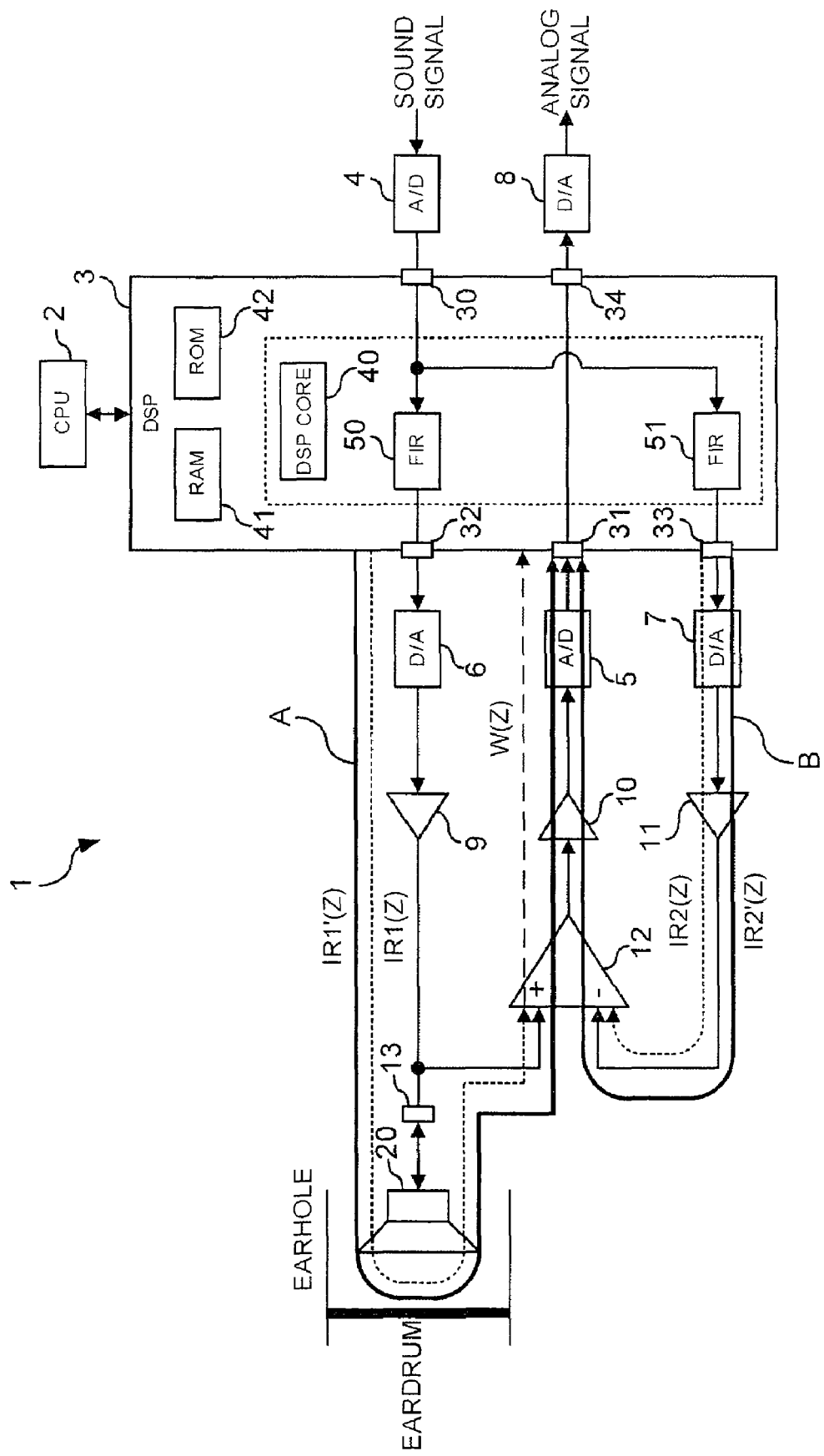
FIG. 1 depicts a block diagram of an example of an echo preventing circuit applied with the present invention.

FIG. 1 depicts a block diagram of an example of an echo preventing circuit applied with the present invention. An echo preventing circuit 1 includes a CPU (Central Processing Unit) 2, a digital signal processing circuit (DSP: Digital Signal Processor) 3, AD converters 4 and 5, DA converters 6 to 8, amplifying circuits 9 to 11, a differential amplifying circuit 12, and an input/output terminal 13. The DA converter 6 corresponds to a first DA converter of the present invention and the DA converter 7 corresponds to a second DA converter of the present invention. The differential amplifying circuit 12 corresponds to a subtracting circuit of the present invention. Though the CPU 2 is a structural requirement for the echo preventing circuit 1 in the embodiment, the CPU 2 may not be a structural requirement.

The DSP 3 is configured to include input terminals 30 and 31, output terminals 32 to 34, a DSP core 40, a RAM (random Access Memory) 41, and a ROM (Read Only Memory) 42. The DSP 3 includes FIR (Finite Impulse Response) filters 50 and 51. These FIR filters 50 and 51 are realized by execution by the DSP core 40 of a program stored in the RAM 41 or the ROM 42. In this case, the FIR filter 50 corresponds to a first FIR filter of the present invention and the FIR filter 51 corresponds to a second FIR filter of the present invention. The FIR filters 50 and 51 can also be realized by hardware.

The AD converter 4 is inputted with, for example, a sound signal. The AD converter 4 applies an analog-to-digital conversion process to the sound signal and inputs a digital signal obtained (a first digital signal) into the DSP 3 through the input terminal 30.

The digital signal inputted into the DSP 3 is inputted to each of the FIR filters 50 and 51. The FIR filter 50 applies a convolution calculating process to the digital signal inputted thereinto based on the filter coefficients of the FIR filter 50 and outputs a digital signal obtained (a second digital signal) to the output terminal 32. Simultaneously, the FIR filter 51 applies the convolution calculating process to the digital signal inputted thereinto based on the filter coefficients of the FIR filter 51 and outputs a digital signal obtained (a third digital signal) to the output terminal 33.

The DA converter 6 is inputted with the output signal from the FIR filter 50 through the output terminal 32. The DA converter 6 applies a digital-to-analog conversion process to the output signal from the FIR filter 50 and outputs an analog signal obtained (a first analog signal) to the amplifying circuit 9. The amplifying circuit 9 amplifies the analog signal by a predetermined amplification factor and outputs the amplified analog signal.

The input/output terminal 13 is connected to an earphone microphone 20. The earphone microphone 20 has a speaker function of generating sound by vibrating a diaphragm not shown based on a sound signal inputted from the input/output terminal 13. The earphone microphone 20 also has a microphone function of generating a sound signal by converting into vibration of the diaphragm the vibration of the eardrum caused when a person wearing the earphone microphone 20 in his/her ear emanates sound. The earphone microphone 20 is a known technology and is described in Japanese Patent Application Laid-Open Publication No. 2003-9272, etc. The sound signal (the third analog signal) generated by the earphone microphone 20 is inputted into a positive input terminal of the differential amplifying circuit 12 through the input/output terminal 13. The signal outputted to the earphone microphone 20 through the input/output terminal 13 is reflected, is inputted from the input/output terminal 13, and is inputted into the positive input terminal of the differential amplifying circuit 12. In this case, the "signal reflected" refers to collectively signals such as the signal that travels back through the earphone microphone 20 and the signal that is formed by converting reflected sound of the sound outputted from the earphone microphone 20 and reflected inside an ear into a sound signal by the earphone microphone 20. The input/output terminal 13 is not a terminal into which an output signal is inputted or which outputs an input signal, both exclusively. For example, the input/output terminal 13 can simultaneously be inputted with an output signal and output an input signal.

The DA converter 7 is inputted with an output signal from the FIR filter 51 through the output terminal 33. The DA converter 7 applies a digital-to-analog converting process to the output signal from the FIR filter 51 and outputs an analog signal obtained (a second analog signal) to the amplifying circuit 11. The amplifying circuit 11 amplifies the analog signal by a predetermined amplification factor and outputs the analog signal amplified to a negative input terminal of the differential amplifying circuit 12.

The differential amplifying circuit 12 outputs the sound signal from the input/output terminal 13 to the amplifying circuit 10. The amplifying circuit 10 amplifies the sound signal by a predetermined amplification factor and outputs the sound signal amplified to the AD converter 5. The positive input terminal of the differential amplifying circuit 12 is inputted with the analog signal from the amplifying circuit 9. The differential amplifying circuit 12 outputs a signal (a fourth analog signal) formed by amplifying the difference between the analog signal inputted into the positive input terminal of the circuit 12 and the analog signal inputted into the negative input terminal of the circuit 12.

The AD converter 5 applies an analog-to-digital converting process to the sound signal from the amplifying circuit 10 and inputs a digital signal obtained to the DSP 3 through the input terminal 31. The digital signal inputted into the input terminal 31 is outputted from the output terminal 34. The DA converter 8 is inputted with the digital signal outputted from the DSP 3 through the output terminal 34. The DA converter 8 applies a digital-to-analog converting process to the digital signal and outputs an analog signal obtained.

The CPU 2 controls the entire echo preventing circuit 1. When the CPU 2 is inputted with, for example, a resetting signal to reset the echo preventing circuit 1, the CPU 2 outputs to the DSP 3 an instructing signal to cause an impulse response acquiring process described below to be executed. For example, the CPU 2 may output the above instructing signal to the DSP 3 when the CPU 2 detects turning on of the power to operate the echo preventing circuit 1. The CPU 2 may output the above instructing signal to the DSP 3 when the CPU 2 detects electric variation of the analog circuit (for example, variation of the amplitude of the output of the amplifying circuit 10).

Figure 2:
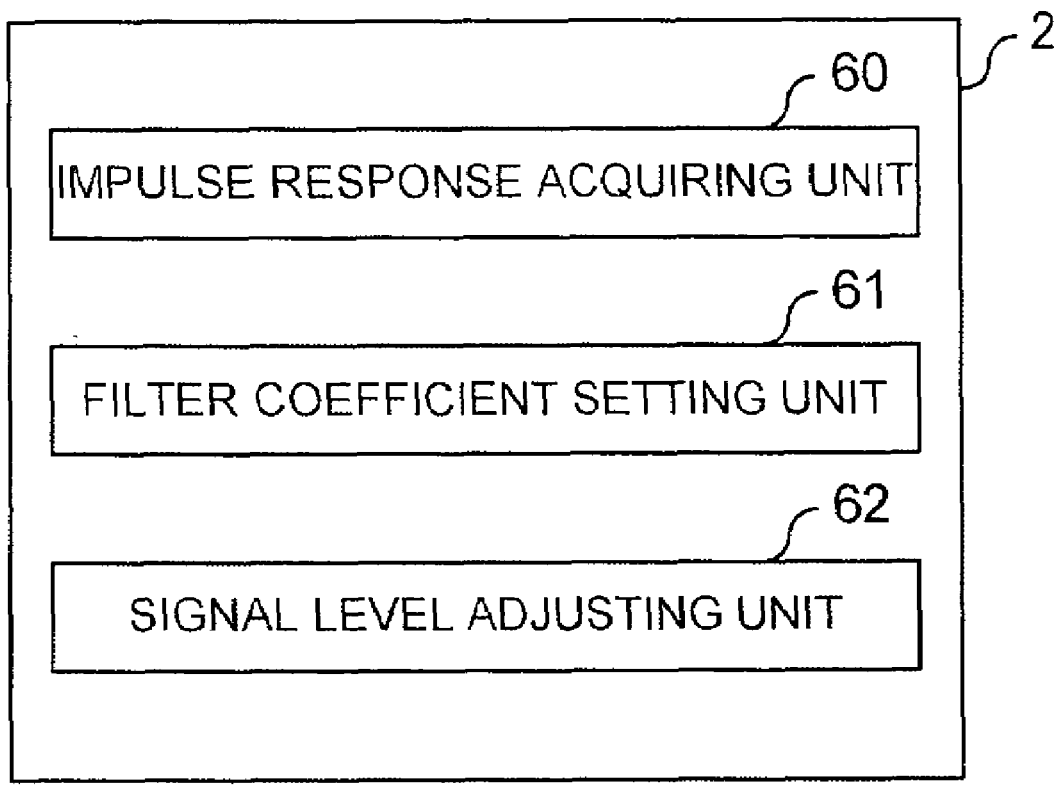
FIG. 2 depicts the configuration of a functional block that is realized by execution by a DSP core of a program.

The DSP core 40 (a processor) can realize various types of process in the DSP 3 by executing the program stored in the RAM 41 or the ROM 42. FIG. 2 depicts the configuration of a functional block that is realized by execution by a DSP core 40 of a program. The DSP 3 includes an impulse response acquiring unit 60, a filter coefficient setting unit 61, and a signal level adjusting unit 62. A processing apparatus constituted of the impulse response acquiring unit 60, the filter coefficient setting unit 61, and the signal level adjusting unit 62 corresponds to a filter coefficient setting apparatus of the present invention.

The impulse response acquiring unit 60 acquires an impulse response IR1'(Z) (a first response signal) of a path A indicated by a solid line of FIG. 1 from the input terminal 31 by outputting an impulse (a first signal) from the output terminal 32. The impulse response acquiring unit 60 acquires another impulse response IR2'(Z) (a second response signal) of a path B indicated by another solid line of FIG. 1 from the input terminal 31 by outputting another impulse (a second signal) from the output terminal 33. The impulse response acquiring unit 60 can adjust the magnitude of each of the impulses outputted respectively from the output terminal 32 and 33 such that each of the impulse responses IR1'(Z) and IR2'(Z) has proper magnitude.

The filter coefficient setting unit 61 sets the filter coefficients of the FIR filter 51 based on the impulse response IR1'(Z) acquired. The filter coefficient setting unit 61 also sets the filter coefficients of the FIR filter 50 based on the impulse response IR2'(Z) acquired.

The signal level adjusting unit 62 adjusts the signal level of each of the signals respectively outputted from the output terminal 32 and 33 based on the amount by which the magnitude of each of the impulses from the impulse response acquiring unit 60 is to be adjusted.

Principle of Canceling Echoes

Description will be given for the principle of canceling echoes in the echo preventing circuit 1. The impulse response (the transfer function) of a section from the output terminal 32 to the positive input terminal of the differential amplifying circuit 12 indicated by a dotted line of FIG. 1 is denoted by IR1(Z). The impulse response (the transfer function) of a section from the output terminal 33 to the negative input terminal of the differential amplifying circuit 12 indicated by a dotted line of FIG. 1 is denoted by IR2(Z). The impulse response (the transfer function) of a section from the latter stage of the positive/negative input terminal of the differential amplifying circuit 12 to the input terminal 31 indicated by a dotted line of FIG. 1 is denoted by W(Z).

In this case, the impulse response (the transfer function) IR1'(Z) of the path A indicated by a solid line of the FIG. 1 is as IR1'(Z)=IR1(Z)·W(Z). The impulse response (the transfer function) IR2'(Z) of the path B indicated by a solid line of the FIG. 1 is as IR2'(Z)=−IR2(Z)·W(Z). Why the phase of IR2(Z) is inversed is because the impulse is inputted into the negative input terminal of the differential amplifying circuit 12.

Assuming that the filter coefficients of the FIR filter 50 is −IR2'(Z) formed by inverting the phase of IR2'(Z), the characteristic IRa11_1(Z) of a section from the input of the FIR filter 50 to the input terminal 31 is as follows.

$$IRall\_1(Z) = -IR2'(Z) \cdot IR1'(Z)$$
$$= (-(-IR2(Z) \cdot W(Z)) \cdot (IR1(Z) \cdot W(Z))$$
$$= IR2(Z) \cdot W(Z) \cdot IR1(Z) \cdot W(Z)$$

Assuming that the filter coefficients of the FIR filter 51 is IR1'(Z), the characteristic IRa11_2(Z) of a section from the input of the FIR filter 51 to the input terminal 31 is as follows.

$$IRall\_2(Z) = IR1'(Z) \cdot IR2'(Z)$$
$$= IR1(Z) \cdot W(Z) \cdot (-IR2(Z) \cdot W(Z))$$
$$= IR1(Z) \cdot W(Z) \cdot (-IR2(Z)) \cdot W(Z)$$
$$= -IRall\_1(Z)$$

That is, it can be seen that the characteristic IRa11_1(Z) of the section from the input of the FIR filter 50 to the input terminal 31 and the characteristic IRa11_2(Z) of the section from the input of the FIR filter 51 to the input terminal 31 each have a characteristic of canceling each other. As a result, it can be seen that −IR2'(Z) obtained by inverting the phase of IR2'(Z) may be set as the filter coefficients of the FIR filter 50 and IR1'(Z) may be set as the filter coefficients of the FIR filter 51.

Assuming that the filter coefficients of the FIR filter 50 is IR2'(Z), the characteristic IRa11_1(Z) of the section from the input of the FIR filter 50 to the input terminal 31 is as follows.

$$IRall\_1(Z) = IR2'(Z) \cdot IR1'(Z)$$
$$= (-IR2(Z) \cdot W(Z)) \cdot (IR1(Z) \cdot W(Z))$$
$$= -IR2(Z) \cdot W(Z) \cdot IR1(Z) \cdot W(Z)$$

Assuming that the filter coefficients of the FIR filter 51 is −IR1'(Z) obtained by inverting the phase of IR1'(Z), the characteristic IRa11_2(Z) of a section from the input of the FIR filter 51 to the input terminal 31 is as follows.

$$IRall\_2(Z) = -IR1'(Z) \cdot IR2'(Z)$$
$$= (-(IR1(Z) \cdot W(Z))) \cdot (-IR2(Z) \cdot W(Z))$$
$$= IR1(Z) \cdot W(Z) \cdot IR2(Z) \cdot W(Z)$$
$$= -IRall\_1(Z)$$

That is, it can be seen that the characteristic IRa11_1(Z) of the section from the input of the FIR filter 50 to the input terminal 31 and the characteristic IRa11_2(Z) of the section from the input of the FIR filter 51 to the input terminal 31 each have a characteristic of canceling each other. As a result, it can be seen that IR2'(Z) may be set as the filter coefficients of the FIR filter 50 and −IR1'(Z) obtained by inverting the phase of IR1'(Z) may be set as the filter coefficients of the FIR filter 51.

By setting the filter coefficients of the FIR filters 50 and 51 as above, the differential amplifying circuit 12 can cancel the signal traveling on the path A using the signal traveling on the path B. As a result, the above echoes generated when the digital signal is inputted into the input terminal 30 can be prevented.

As shown in FIG. 1, by acquiring the impulse response IR1'(Z) while the earphone microphone 20 is connected, and setting IR1'(Z) as the filter coefficients of the FIR filter 51, effective echo prevention can be executed corresponding to the transfer characteristic of the earphone microphone 20. By acquiring the impulse response IR1'(Z) while the earphone microphone 20 connected is set to the ear by inserting the earphone microphone 20 into the earhole or covering the ear pinna with the earphone microphone 20, and setting IR1'(Z) as the filter coefficients of the FIR filter 51, effective echo prevention can be executed corresponding to the transfer characteristic of the earphone microphone 20 and the transfer characteristic of the interior of the ear of the user. The filter coefficients of the FIR filter 51 can be set based on the impulse response IR1'(Z) that is acquired while the earphone microphone 20 is not connected.

Filter Coefficients Setting Process

When the magnitude of each of the impulses outputted respectively from the output terminal 32 and 33 is too small, the precision of the impulse responses IR1'(Z) and IR2'(Z) is degraded by the background noises, the circuit noises, etc. When the magnitude of each of the impulses is too large, the impulses overflow in the AD converter and, therefore, the impulse responses IR1'(Z) and IR2'(Z) can not be acquired accurately. Therefore, the DSP 3 acquires the impulse responses IR1'(Z) and IR2'(Z) each having the proper magnitude by adjusting the magnitude of the impulse and sets the filter coefficients of the FIR filters 50 and 51 based on the impulse responses IR1'(Z) and IR2'(Z) each having the proper magnitude.

Figure 3:
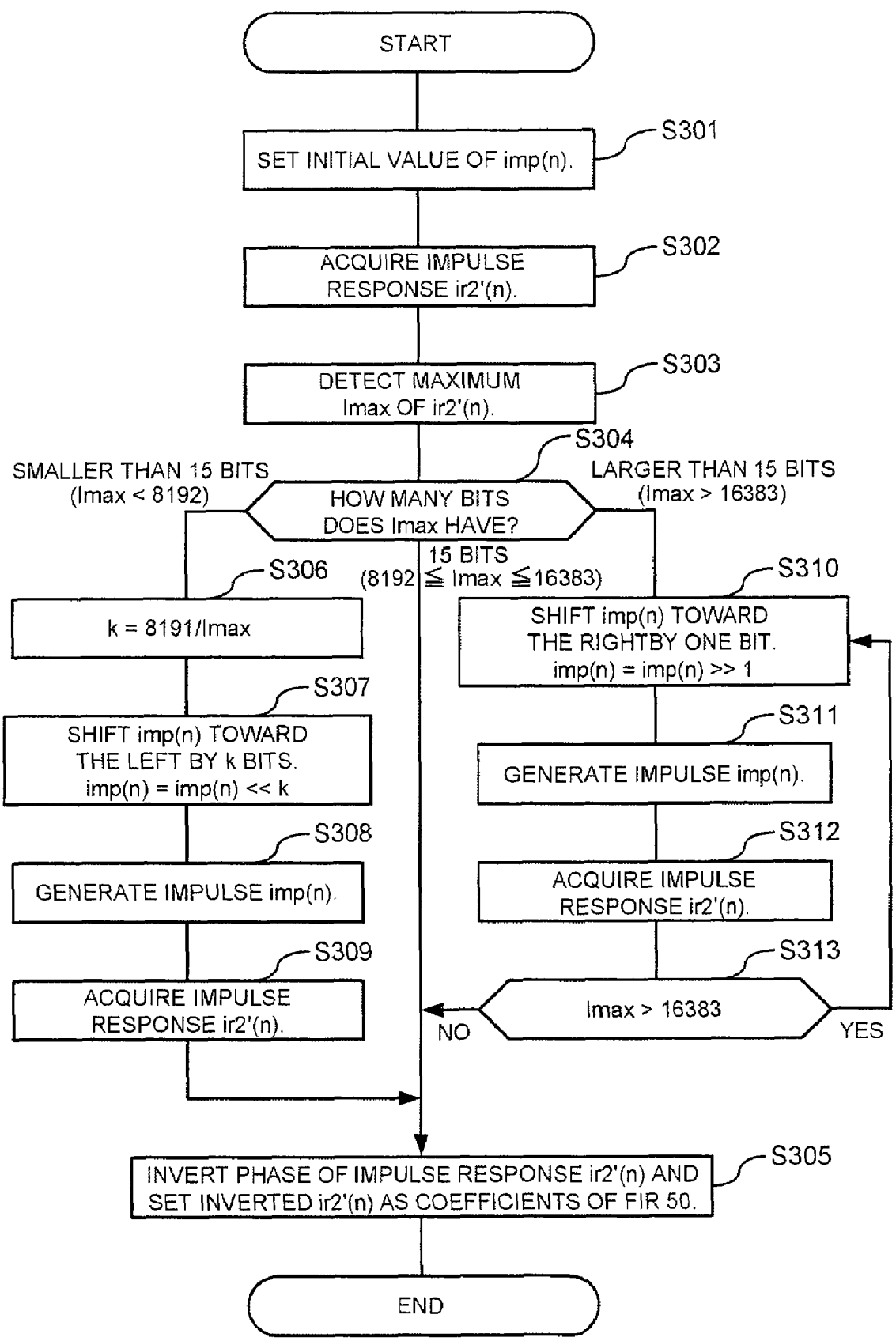
FIG. 3 depicts a flowchart of an example of a process to set the filter coefficients of an FIR filter 50.

FIG. 3 depicts a flowchart of an example of a process to set the filter coefficients of the FIR filter 50. The impulse response acquiring unit 60 sets the initial value of an impulse imp(n) (n=0 to N) (S301). The initial value of imp(n) may be, for example, imp(0)=0×1,800, imp(1) to imp(N)=0, and N=128. "0×" indicates that the number therewith is represented in the hexadecimal numeration system. The impulse response acquiring unit 60 acquires an impulse response ir2'(n) by outputting an impulse imp(n) from the output terminal 33 (S302). The impulse response acquiring unit 60 detects the maximal value Imax of the acquired impulse response ir2'(n) (S303). The maximal value Imax is the maximum of the absolute value of each of the signals constituting the impulse response ir2'(n) as shown in FIGS. 4A to 4C.

The impulse response acquiring unit 60 judges how many bits Imax has (S304). That is, assuming that the AD converter 5 has the precision of, for example, 16 bits, the impulse response acquiring unit 60 judges whether Imax is equal to or larger than 8,192 and equal to or smaller than 16,383 (15 bits) or Imax is smaller than 8,192 (smaller than 15 bits) or larger than 16,383 (larger than 15 bits).

Figure 4A:
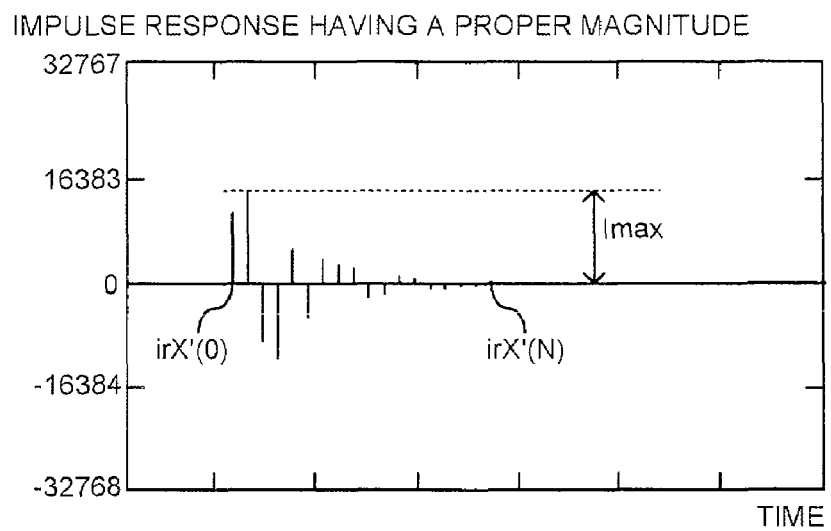
FIG. 4A depicts an example of an impulse response having a proper magnitude.

When Imax is equal to or larger than 8,192 and equal to or smaller than 16,383, the impulse response ir2'(n) has a proper magnitude as shown in FIG. 4A. In this case, the filter coefficient setting unit 61 sets −ir2'(n) obtained by inverting the phase of ir2'(n) as the filter coefficients of the FIR filter 50 (S305).

Figure 4B:
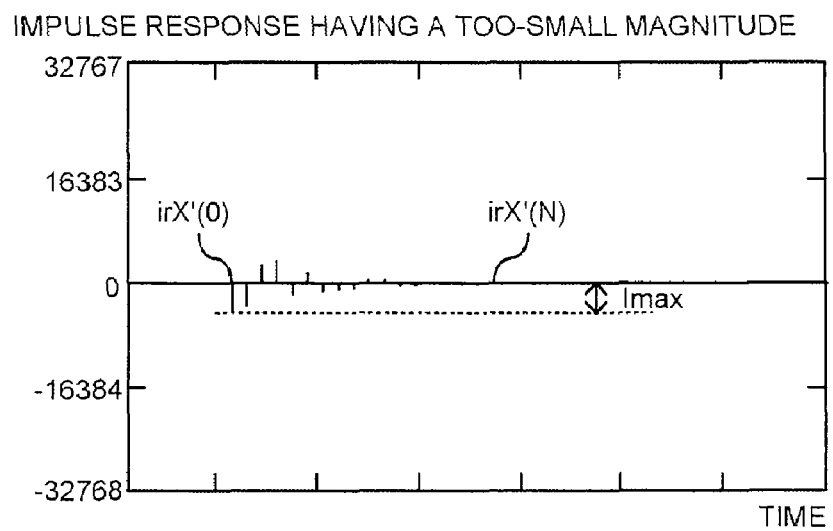
FIG. 4B depicts an example of an impulse response having a magnitude that is too small.
Figure 4C:
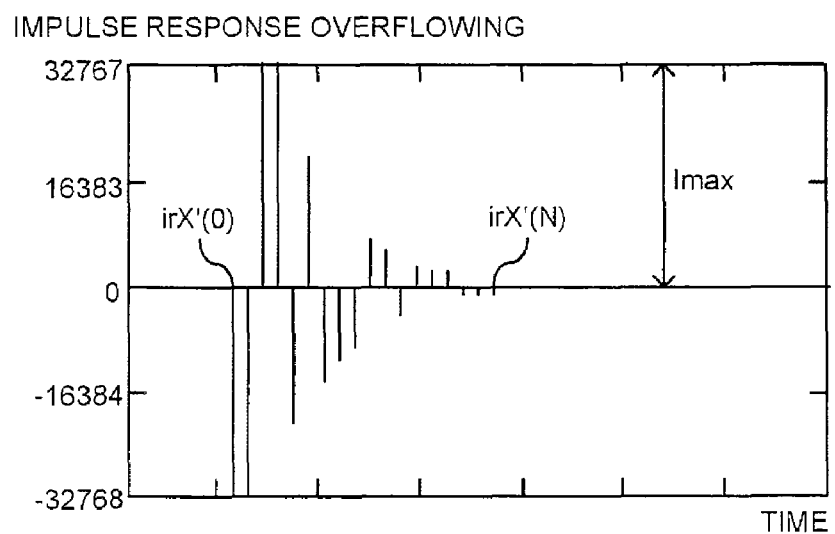
FIG. 4C depicts an example of an impulse response that overflows.

When Imax is smaller than 8,192, the impulse response ir2'(n) is too small as shown in FIG. 4B. The impulse response acquiring unit 60 obtains a value (k) that indicates by how much the impulse should be enhanced, for example, k=8,191/ Imax (S306). When k is obtained, the decimal fraction portion of the obtained value is rounded down. The impulse response acquiring unit 60 shifts the impulse imp(n) toward the left by k bits (S307) and generates the shifted impulse imp(n) (S308). The impulse response acquiring unit 60 acquires again the impulse response ir2'(n) using the impulse imp(n) of which the magnitude has been adjusted (S309). That is, the impulse imp(n) has been shifted toward the left by k bits and, thereby, has been multiplied by 2k. Thereby, the impulse response ir2'(n) that has been acquired again has the proper magnitude as shown in FIG. 4A. The filter coefficient setting unit 61 sets −ir2'(n) obtained by inverting the phase of ir2'(n) acquired again as the filter coefficients of the FIR filter 50 (S305).

When Imax is larger than 16,383, the impulse response ir2'(n) overflows as shown in FIG. 4C. In this case, because the impulse response acquiring unit 60 does not know the extent of the overflowing, the unit 60 repeatedly acquires the impulse response ir2'(n) reducing stepwise the magnitude of the impulse imp(n). More specifically, the impulse response acquiring unit 60 shifts the impulse imp(n) toward the right by, for example, one bit (S310) and generates the shifted impulse imp(n) (S311). The impulse response acquiring unit 60 acquires again the impulse response ir2'(n) using the impulse imp(n) that has been shifted toward the right by one bit and of which the magnitude has been reduced to one half of the original magnitude thereof (S312). The impulse response acquiring unit 60 judges whether Imax of the impulse response ir2'(n) acquired again is larger than 16,383 (S313). When the impulse response ir2'(n) is larger than 16,383 (S313: YES), the process of shifting of the impulse imp(n) toward the right and re-acquiring of the impulse response ir2'(n) (S310 to S312) is repeatedly executed. When Imax is equal to or smaller than 16,383 (S313: NO), the impulse response ir2'(n) acquired again has a proper magnitude as shown in FIG. 4A. The filter coefficient setting unit 61 sets −ir2'(n) obtained by inverting the phase of the impulse response ir2'(n) acquired again as the filter coefficients of the FIR filter 50.

Figure 5:
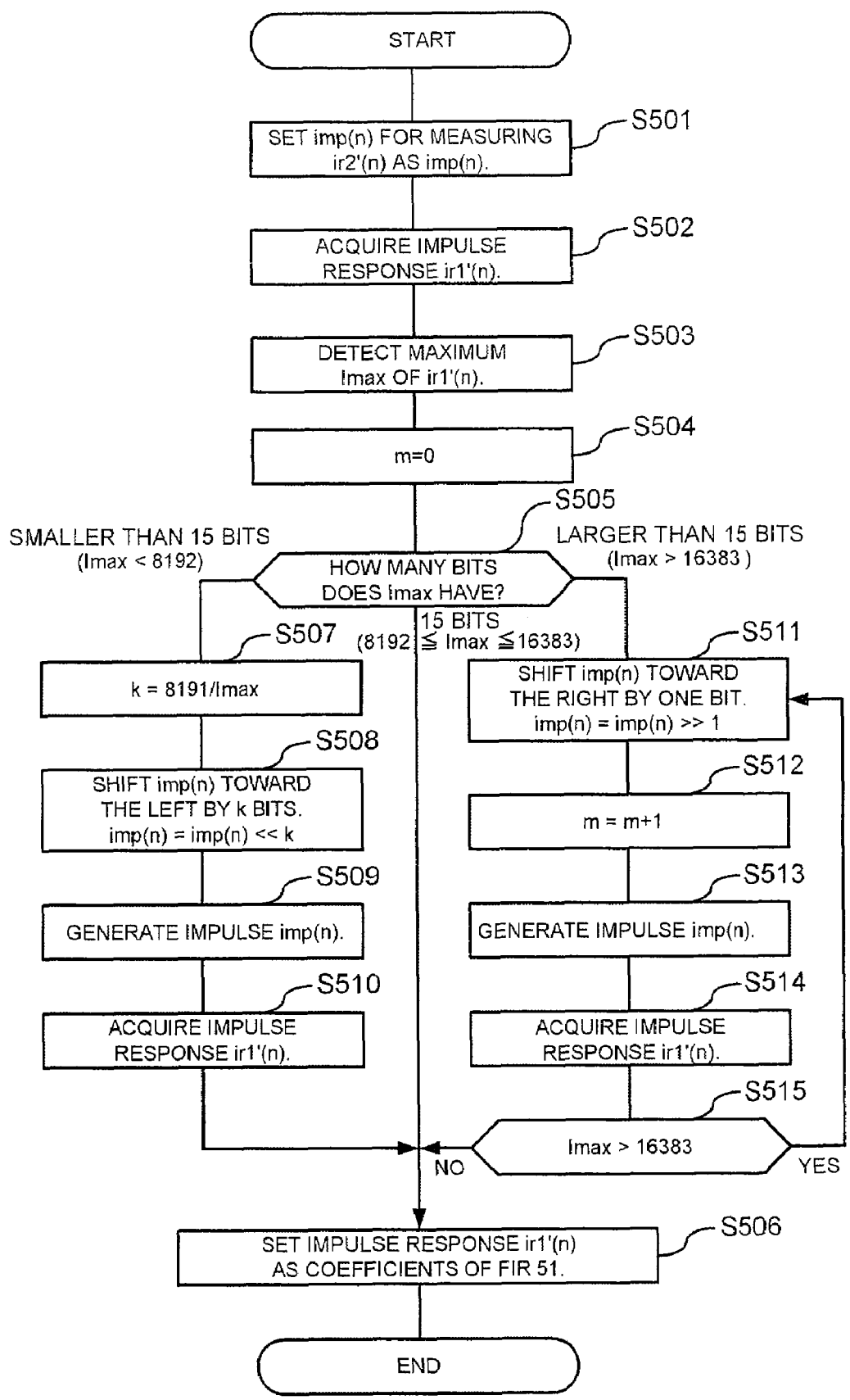
FIG. 5 depicts a flowchart of an example of a process to set the filter coefficients of an FIR filter 51.

A process to set the filter coefficients of the FIR filter 51 is executed. FIG. 5 depicts a flowchart of an example of a process to set the filter coefficients of the FIR filter 51. The impulse response acquiring unit 60 sets the magnitude of the impulse imp(n) to be the magnitude set when the impulse response ir2'(n) has been acquired last (S501). The impulse response acquiring unit 60 acquires the impulse response ir1'(n) by outputting impulse imp(n) from the output terminal 32 (S502). The impulse response acquiring unit 60 detects the maximum Imax of the impulse response ir1'(n) acquired again (S503) and sets the initial value "zero" as a variable m that indicates the amount by which the impulse is to be adjusted (S504).

The impulse response acquiring unit 60 judges how many bits Imax has (S505). That is, assuming that the AD converter 5 has the precision of, for example, 16 bits, the impulse response acquiring unit 60 judges whether Imax is equal to or larger than 8,192 and equal to or smaller than 16,383 (15 bits) or Imax is smaller than 8,192 (smaller than 15 bits) or larger than 16,383 (larger than 15 bits).

When Imax is equal to or larger than 8,192 and equal to or smaller than 16,383, the impulse response ir1'(n) has a proper magnitude as shown in FIG. 4A. In this case, the filter coefficient setting unit 61 sets ir1'(n) obtained as the filter coefficients of the FIR filter 51 (S506).

When Imax is smaller than 8,192, the impulse response ir1'(n) is too small as shown in FIG. 4B. The impulse response acquiring unit 60 obtains a value (k) that indicates by how much the impulse should be enhanced, for example, k=8,191/ Imax (S507). When k is obtained, the decimal fraction portion of the obtained value is rounded down. The impulse response acquiring unit 60 shifts the impulse imp(n) toward the left by k bits (S508) and generates the shifted impulse imp(n) (S509). The impulse response acquiring unit 60 acquires again the impulse response ir1'(n) using the impulse imp(n) of which the magnitude has been adjusted (S510). That is, the impulse imp(n) has been shifted toward the left by k bits and, thereby, has been multiplied by 2k. Thereby, the impulse response ir1'(n) that has been acquired again has the proper magnitude as shown in FIG. 4A. The filter coefficient setting unit 61 sets ir1'(n) acquired again as the filter coefficients of the FIR filter 51 (S506).

When Imax is larger than 16,383, the impulse response ir1'(n) overflows as shown in FIG. 4C. In this case, because the impulse response acquiring unit 60 does not know the extent of the overflowing, the unit 60 repeatedly acquires the impulse response ir1'(n) reducing stepwise the magnitude of the impulse imp(n). More specifically, the impulse response acquiring unit 60 shifts the impulse imp(n) toward the right by, for example, one bit (S511), counts up the variable m (S512), and generates the shifted impulse imp(n) (S513). The impulse response acquiring unit 60 acquires again the impulse response ir1'(n) using the impulse imp(n) that has been shifted toward the right by one bit and of which the magnitude has been reduced to one half of the original magnitude thereof (S514). The impulse response acquiring unit 60 judges whether Imax of the impulse response ir1'(n) acquired again is larger than 16,383 (S515). When the impulse response ir1'(n) is larger than 16,383 (S515: YES), the process of shifting of the impulse imp(n) toward the right and re-acquiring of the impulse response ir1'(n) (S511 to S514) is repeatedly executed. When Imax is equal to or smaller than 16,383 (S515: NO), the impulse response ir1'(n) acquired again has a proper magnitude as shown in FIG. 4A. The filter coefficient setting unit 61 sets ir1'(n) acquired again as the filter coefficients of the FIR filter 51.

When the magnitude of the impulse imp(n) employed when the impulse response ir1'(n) has been acquired and that employed when the impulse response ir2'(n) has been acquired differ from each other, the signal level of the signal inputted into the differential amplifying circuit 12 needs to be adjusted to set IRa11_2(Z) as IRa11_2(Z)=−IRa11_1(Z) as above. For example, when the impulse imp(n) is shifted toward the left by k bits in the case where the impulse response ir1'(n) is acquired, the signal level adjusting unit 62 outputs from the output terminal 33 the signal outputted from the FIR filter 51 after shifting this signal toward the right by k bits or outputs from the output terminal 32 the signal outputted from the FIR filter 50 after shifting this signal toward the left by k bits.

When the impulse imp(n) is shifted toward the right by m bits in the case where the impulse response ir1'(n) is acquired, the signal level adjusting unit 62 outputs from the output terminal 33 the signal outputted from the FIR filter 51 after shifting this signal toward the left by m bits or outputs from the output terminal 32 the signal outputted from the FIR filter 50 after shifting this signal toward the right by m bits.

By adjusting the filter coefficients set for the FIR filters 50 and 51, the signal level of the signals outputted from the output terminals 32 and 33 can be adjusted. For example, when the impulse imp(n) is shifted toward the left by k bits in the case where the impulse response ir1'(n) is acquired, the signal level adjusting unit 62 shifts the acquired impulse response ir1'(n) toward the right by k bits and the filter coefficient setting unit 61 sets the impulse response ir1'(n) that has been shifted toward the right by k bits as the filter coefficients of the FIR filter 51 and, thereby, the signal level of the signal outputted from the output terminal 33 can be adjusted. Otherwise, in this case, the signal level adjusting unit 62 shifts the acquired impulse response ir2'(n) toward the left by k bits and the filter coefficient setting unit 61 sets the impulse response ir2'(n) that has been shifted toward the left by k bits as the filter coefficients of the FIR filter 50 and, thereby, the signal level of the signal outputted from the output terminal 32 can be adjusted.

For example, when the impulse imp(n) is shifted toward the right by m bits in the case where the impulse response ir1'(n) is acquired, the signal level adjusting unit 62 shifts the acquired impulse response ir1'(n) toward the left by m bits and the filter coefficient setting unit 61 sets the impulse response ir1'(n) that has been shifted toward the left by m bits as the filter coefficients of the FIR filter 51 and, thereby, the signal level of the signal outputted from the output terminal 33 can be adjusted. Otherwise, in this case, the signal level adjusting unit 62 shifts the acquired impulse response ir2'(n) toward the right by m bits and the filter coefficient setting unit 61 sets the impulse response ir2'(n) that has been shifted toward the right by m bits as the filter coefficients of the FIR filter 50 and, thereby, the signal level of the signal outputted from the output terminal 32 can be adjusted.

By adjusting as above the signal levels of the signals outputted respectively from the output terminals 32 and 33 based on the amount by which the impulse imp(n) employed when the impulse response ir1'(n) is acquired is to be adjusted, the relation of the above IRa11_2(Z)=−IRa11_1(Z) can be established and the echoes generated when the digital signal is inputted into the input terminal 30 can be prevented.

Though the relation of IRa11_2(Z)=−IRa11_1(Z) can be established by adjusting the signal levels of the signals outputted respectively from the output terminals 32 and 33 in the embodiment, the relation of IRa11_2(Z)=−IRa11_1(Z) may be established by adjusting the signal levels of the signals outputted respectively from the DA converters 6 and 7 and the amplifying circuits 9 and 11.

Though the phase of the impulse response ir2'(n) is inverted and the phase-inverted ir2'(n) is set as the filter coefficients of the FIR filter 50 and the impulse response ir1'(n) is set as the filter coefficients of the FIR filter 51 in the embodiment, the impulse response ir2'(n) may be set as the filter coefficients of the FIR filter 50 and the phase of the impulse response ir1'(n) may be inverted and the phase-inverted ir1'(n) may be set as the filter coefficients of the FIR filter 51.

Though the filter coefficients of the FIR filter 50 is firstly set based on the impulse response ir2'(n) acquired by adjusting the magnitude of the impulse imp(n) and the filter coefficients of the FIR filter 51 is secondly set based on the impulse response ir1'(n) acquired by adjusting the magnitude of the impulse imp(n) in the embodiment, the above order may be reversed. That is, the filter coefficients of the FIR filter 51 may be firstly set based on the impulse response ir1'(n) acquired by adjusting the magnitude of the impulse imp(n) and the filter coefficients of the FIR filter 50 may be secondly set based on the impulse response ir2'(n) acquired by adjusting the magnitude of the impulse imp(n). In this case, the signal level adjusting unit 62 may adjust the signal levels of the signals outputted respectively from the output terminals 32 and 33 based on the amount by which the impulse imp(n) employed when the impulse response ir2'(n) is acquired is to be adjusted.

Application of Echo Preventing Circuit

Figure 6:
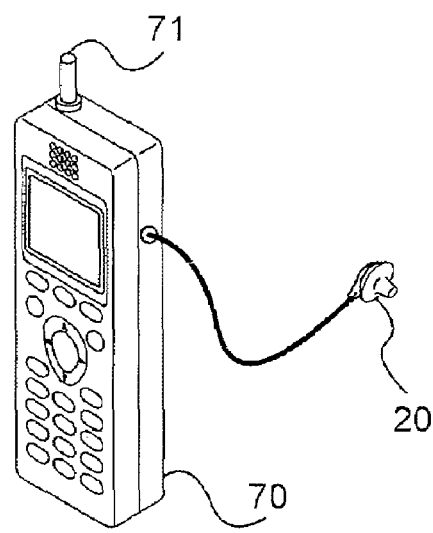
FIG. 6 depicts a schematic view of a mobile phone 70 applied with the echo preventing circuit.
Figure 7:
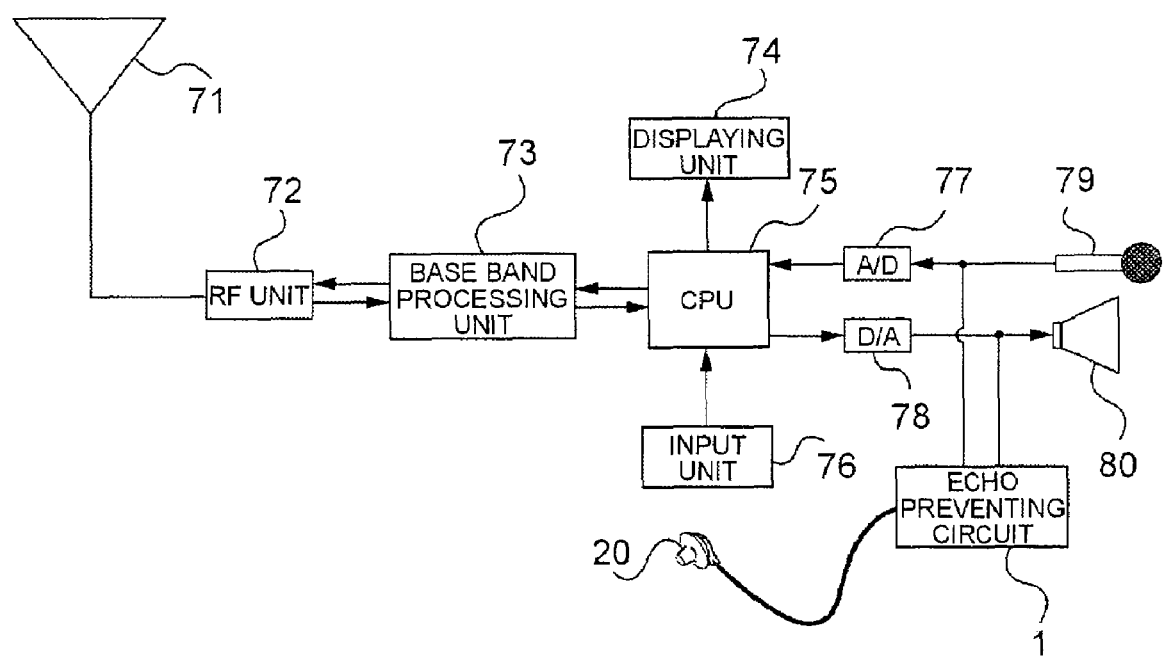
FIG. 7 depicts a block diagram of an example of the configuration of the mobile phone.
Figure 8:
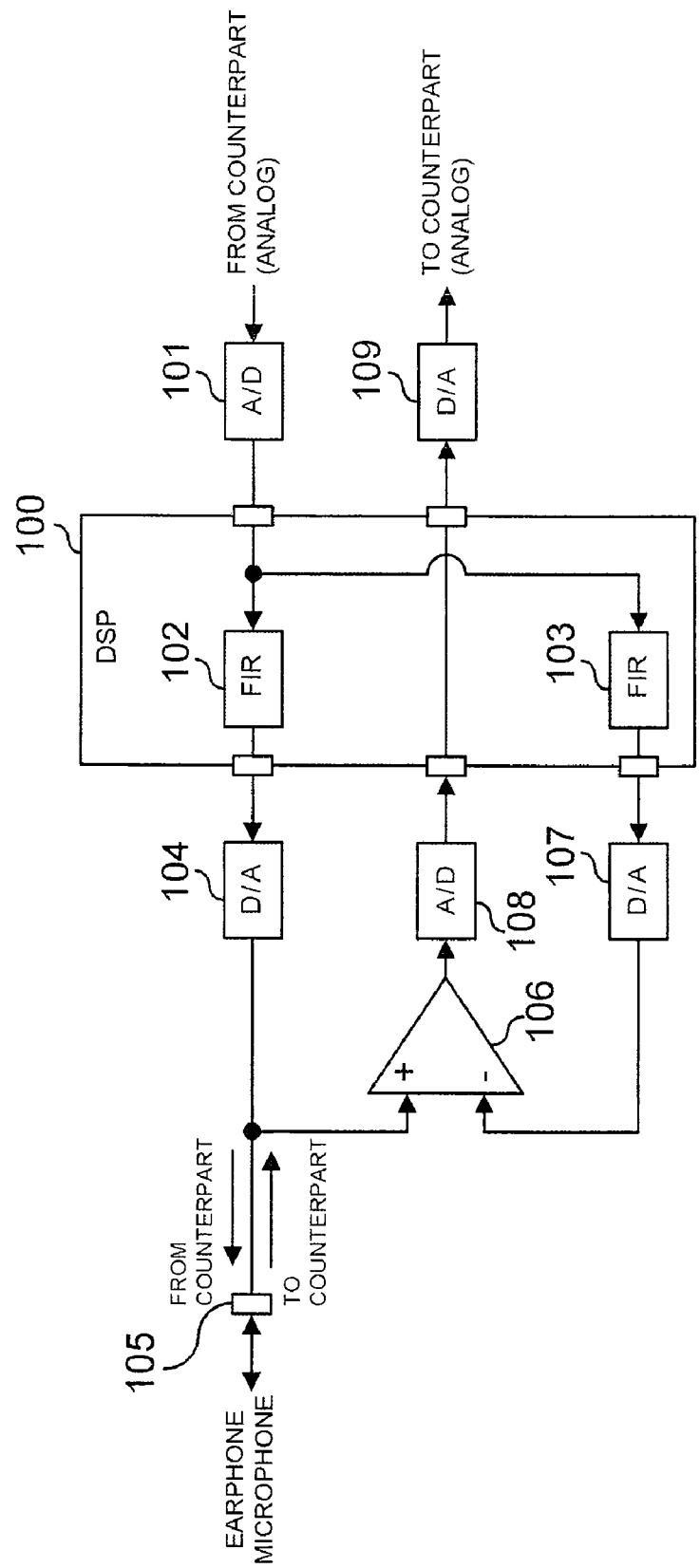
FIG. 8 depicts a conventional echo preventing circuit.
Figure 9A:
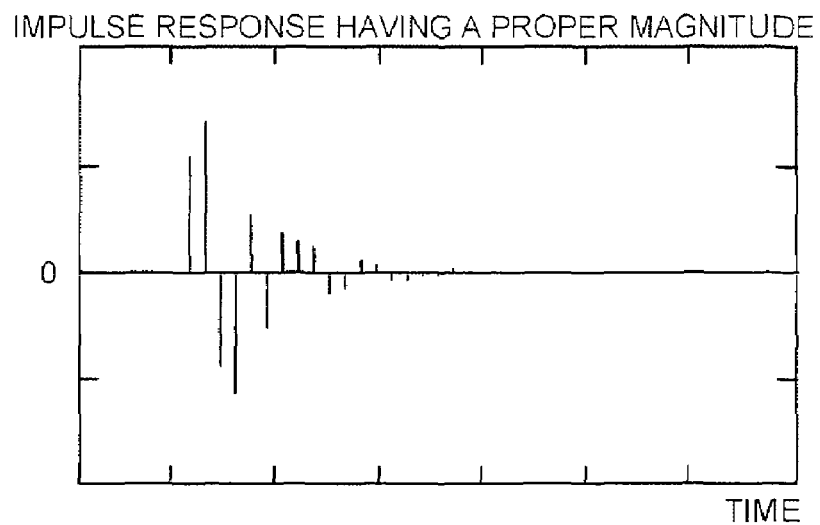
FIG. 9A depicts an example of an impulse response having a proper magnitude.
Figure 9B:
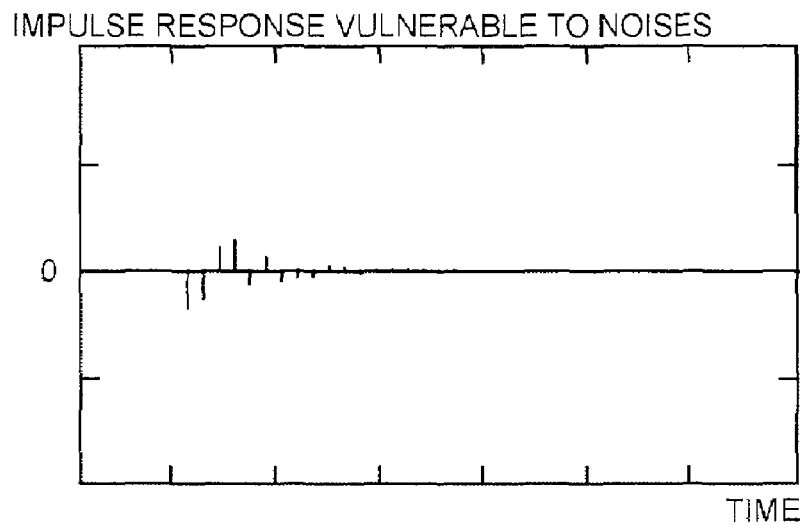
FIG. 9B depicts an example of an impulse response that is vulnerable to noises.
Figure 9C:
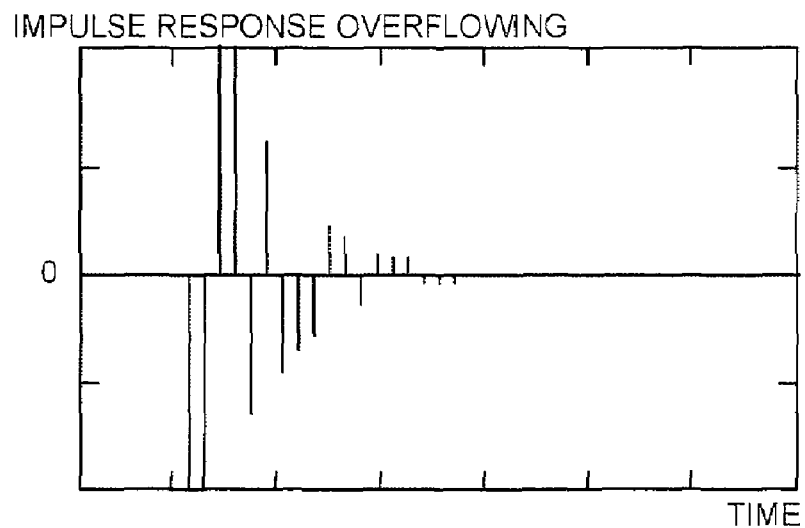
FIG. 9C depicts an example of an impulse response that overflows.

Description will be given for an application of the echo preventing circuit. FIG. 6 depicts a schematic view of a mobile phone 70 applied with the echo preventing circuit 1. FIG. 7 depicts a block diagram of an example of the configuration of the mobile phone 70 shown in FIG. 6. As shown in FIGS. 6 and 7, the mobile phone 70 is connected to an earphone microphone 20. Though the earphone microphone 20 and the mobile phone 70 are connected being wired, the earphone 20 and the phone 70 may be connected by wireless.

The mobile phone 70 includes the echo preventing circuit 1, an antenna 71, an RF (Radio Frequency) unit 72, a base-band processing unit 73, a displaying unit 74, a CPU 75, an input unit 76, an AD converter 77, a DA converter 78, a microphone 79, and a speaker 80. The configuration of the mobile phone 70 shown in FIG. 7 is an example and a mobile phone to which the echo preventing circuit 1 is applied is not limited to the mobile phone having this configuration.

The antenna 71 receives a sound signal transmitted to the mobile phone 70. The antenna 71 transmits the sound signal from the RF unit 72.

The RF unit 72 executes a decoding process such as a demodulating process to the sound signal at a predetermined frequency band of the sound signal that the antenna 71 receives. The RF unit 72 executes a modulating process to the sound signal from the base-band processing unit 73, for example, an encoding process under TDMA (Time Division Multiplex Access) scheme.

The base-band processing unit 73 applies predetermined signal processing to the sound signal demodulated to a base-band signal by the RF unit 72 and outputs the processed signal to the CPU 75. The base-band processing unit 73 applies predetermined signal processing to a sound signal from the CPU 75 and outputs the processed signal to the RF unit 72.

The CPU 75 controls the entire mobile phone 70. To reproduce the sound corresponding to the sound signal from the base-band processing unit 73 using the speaker 80 or the earphone microphone 20, the CPU 75 outputs the sound signal to the DA converter 78. The CPU 75 outputs to the base-band processing unit 73 the sound signal from the microphone 79 or the earphone microphone 20 that is from the AD converter 77. When, for example, the mobile phone 70 is executing packet communication, the CPU 75 outputs a signal to the displaying unit 74 to display an image based on the received packet data. The CPU 75 applies a predetermined process to cause the displaying unit 74 to display the inputted data inputted into the input unit 76 or to transmit the inputted data by the packet communication and outputs the data to the base-band processing unit 73.

The AD converter 77 applies an analog-to-digital converting process to the sound signal from the microphone 79 or the earphone microphone 20 and outputs the converted digital signal to the CPU 75. The DA converter 78 applies an digital-to-analog converting process to the sound signal from the CPU 75 and outputs the converted analog signal to the speaker 80 or the echo preventing circuit 1. Description will be given hereinafter in the embodiment assuming that, when the earphone microphone 20 is connected to the mobile phone 70, the analog signal from the DA converter 78 is inputted into the echo preventing circuit 1.

Description will be given for the operations of the echo preventing circuit 1. Description will be given hereinafter in the application assuming that the setting of the filter coefficients of the FIR filters 50 and 51 has been executed according to the above processes.

The sound signal that the antenna 20 receives is applied with the above processes by the components of the mobile phone 70 and is outputted from the DA converter 78 to the AD converter 4 of the echo preventing circuit 1.

The sound signal inputted into the AD converter 4 is applied with analog-to-digital signal processing by the AD converter 4, is converted into a digital signal, and is inputted into the FIR filters 50 and 51 through the input terminal 30. An output signal outputted from the FIR filter 50 is inputted into the DA converter 6 through the output terminal 32. The output signal is applied with a digital-to-analog converting process by the DA converter 6, is converted into an analog signal, and is inputted into the amplifying circuit 9. The analog signal inputted into the amplifying circuit 9 is amplified by a predetermined amplification factor and is outputted. The analog signal from the amplifying circuit 9 is outputted to the earphone microphone 20 though the input/output terminal 13. As a result, the diaphragm is vibrated and sound is generated by the speaker function of the earphone microphone 30. The analog signal from the amplifying circuit 9 is also inputted into the positive input terminal of the differential amplifying circuit 12.

The output signal outputted from the FIR filter 51 is inputted into the DA converter through the output terminal 33. The output signal is applied with a digital-to-analog converting process, is converted into an analog signal, and is inputted into the amplifying circuit 11. The analog signal inputted into the amplifying circuit 11 is amplified by a predetermined amplification factor and is inputted into the negative input terminal of the differential amplifying circuit 12.

The filter coefficients of the FIR filters 50 and 51 are set according to the above process. Therefore, the differential amplifying circuit 12 can cancel a signal formed by combining the analog signal (the first analog signal) outputted from the amplifying circuit 9 and a reflected signal of the analog signal reflected by the earphone microphone 20, etc., that are inputted into the positive input terminal using the analog signal (the second analog signal) from the amplifying circuit 11 that is inputted into the negative input terminal. As a result, echoes generated when the digital signal is inputted into the input terminal 30 can be prevented. Even when the sound signal (the third analog signal) by the microphone function of the earphone microphone 20, and the signal formed by combining the analog signal (the first analog signal) from the amplifying circuit 9 and a reflected signal of the analog signal reflected by the earphone microphone 20, etc., are superposed on each other and are inputted into the positive input terminal of the differential amplifying circuit 12, the signal component that causes the echoes (that is, the analog signal from the amplifying circuit 9 and the reflected signal of the analog signal) can be subtracted from the superposed signal by inputting the signal from the FIR filter 51 (the second analog signal) into the negative input terminal.

In the case where the filter coefficients of the FIR filter 51 is set based on the impulse response IR1'(Z) that is acquired while the earphone microphone 20 is not connected, the differential amplifying circuit 12 can cancel the analog signal (the first analog signal) outputted from the amplifying circuit 9 using the analog signal (the second analog signal) outputted from the amplifying circuit 11.

However, as described in the embodiment, by setting the filter coefficients of the FIR filter 51 based on the impulse response IR1'(Z) that is acquired while the earphone microphone 20 is connected, the differential amplifying circuit 12 can cancel not only the analog signal (the first analog signal) outputted from the amplifying circuit 9 but also the reflected signal of the analog signal reflected by the earphone microphone 20, etc., and therefore echoes can be canceled with high precision.

Though the description has been given for the case where the echo preventing circuit 1 is applied to the mobile phone 70 in the application, the application is not limited to this. The echo preventing circuit 1 can be applied to any apparatus that may generate the above echoes and can be applied to, for example, an IT (Information Technology) communicating apparatus (for example, a PC (Personal Computer)) and an intercommunicating apparatus (a phone, a transceiver, an on-vehicle apparatus, etc.).

The description has been given for an embodiment of the present invention. As above, the DSP 3 acquires the impulse response ir1'(n) having a proper magnitude by adjusting the magnitude of the impulse imp(n) and sets the filter coefficients of the FIR filter 51 based on the impulse response ir1'(n). That is, the impulse response ir1'(n) having a proper magnitude can be acquired regardless of the internal impedance of the earphone microphone 20, the sensitivity of the speaker, the sensitivity of the microphone, or dispersion of the resistors used in the amplifying circuit 9, differential amplifying circuit 12, etc. caused through manufacture thereof, etc. Therefore, the echo preventing circuit 1 can effectively cancel the echoes.

The DSP 3 acquires the impulse response ir2'(n) having a proper magnitude by adjusting the magnitude of the impulse imp(n) and sets the filter coefficients of the FIR filter 50 based on the impulse response ir2'(n). That is, the impulse response ir2'(n) having a proper magnitude can be acquired regardless of dispersion of the resistors used in the amplifying circuit 11, differential amplifying circuit 12, etc. caused through manufacture thereof, etc. Therefore, the echo preventing circuit 1 can effectively cancel the echoes.

In the case where the magnitude of the impulse imp(n) is adjusted when the impulse response ir1'(n) is acquired, by adjusting the signal levels of the signal outputted from the FIR filter 50 or the FIR filter 51 based on the amount by which the impulse imp(n) is to be adjusted, the relation of IRa11_2(Z)=−IRa11_1(Z) can be establish.

In the case where the magnitude of the impulse imp(n) is adjusted when the impulse response ir2'(n) is acquired, by adjusting the signal levels of the signal outputted from the FIR filter 50 or the FIR filter 51 based on the amount by which the impulse imp(n) is to be adjusted, the relation of IRa11_2(Z)=−IRa11_1(Z) can be establish.

In the case where the magnitude of the impulse imp(n) is adjusted when the impulse response ir1'(n) is acquired, by varying the impulse response ir1'(n) based on the amount by which the impulse imp(n) is to be adjusted and setting the varied impulse response ir1'(n) as the filter coefficients of the FIR filter 51, the relation of IRa11_2(Z)=−IRa11_1(Z) can be establish.

In the case where the magnitude of the impulse imp(n) is adjusted when the impulse response ir2'(n) is acquired, by varying the impulse response ir2'(n) based on the amount by which the impulse imp(n) is to be adjusted and setting the varied impulse response ir2'(n) as the filter coefficients of the FIR filter 50, the relation of IRa11_2(Z)=−IRa11_1(Z) can be establish.

When the level of the maximum Imax of the impulse response ir1'(n) or the impulse response ir2'(n) is smaller than a predetermined level (for example, 8,192), the DSP 3 varies at one time the magnitude of the impulse imp(n) such that the level of Imax is equal to or larger than the predetermined level. That is, the process to set the filter coefficients can be executed at a high speed because the adjustment of the impulse (n) is executed at one time.

When the level of the maximum Imax of the impulse response ir1'(n) or the impulse response ir2'(n) is larger than a predetermined level (for example, 16,383), the DSP 3 reduces stepwise the magnitude of the impulse imp(n) by, for example, shifting the impulse imp(n) toward the right by one bit such that Imax is equal to or smaller than the predetermined level. That is, when the level of Imax is larger than the predetermined level, the DSP 3 does not know the extent of the overflowing and, therefore, the impulse response ir1'(n) or the impulse response ir2'(n) having a proper magnitude can be obtained by reducing stepwise the magnitude of the impulse imp(n).

The above embodiment and application are for facilitating understanding of the present invention and are not for interpreting limiting the present invention. The present invention can be modified and improved without departing from the purview thereof and the present invention includes equivalents thereof.

Though, for example, an impulse response obtained by generating an impulse is set as the filter coefficients of a FIR filter in the embodiment, a signal used to set the filter coefficients is not limited to an impulse. For example, the filter coefficients of a FIR filter may be set based on a response signal obtained when a step signal is generated.

It is claimed:

1. A filter coefficient setting apparatus that sets filter coefficients of an echo preventing circuit having
  a first Finite Impulse Response filter that is inputted with a first digital signal and that outputs a second digital signal,
  a second Finite Impulse Response filter that is inputted with the first digital signal at the same time that the first Finite Impulse Response filter is inputted with the first digital signal, and that outputs a third digital signal,
  a first DA converter that converts the second digital signal into a first analog signal and outputs the first analog signal,
  a second DA converter that converts the third digital signal into a second analog signal and outputs the second analog signal,
  an input/output terminal that outputs the first analog signal or that is inputted with a third analog signal,
  a subtracting circuit that outputs a fourth analog signal obtained by subtracting the second analog signal from a signal formed by combining the first analog signal and the third analog signal, and
  an AD converter that converts the analog signal outputted from the subtracting circuit into a digital signal and outputs the digital signal, the apparatus comprising:
  a response signal acquiring unit that acquires a first response signal of a section from an output of the first Finite Impulse Response filter to an output of the AD converter by generating a first signal, adjusts the magnitude of the first signal in response to the magnitude of the first response signal, and acquires again the first response signal;
  a filter coefficient setting unit that sets the filter coefficients of the second Finite Impulse Response filter based on the first response signal acquired again and sets the filter coefficients of the first Finite Impulse Response filter based on a second response signal of a section from an output of the second Finite Impulse Response filter to an output of the AD converter; and
  a signal level adjusting unit that adjusts the signal levels of the first and the second analog signals based on the amount by which the level of the first signal is to be adjusted such that the fourth analog signal is a signal obtained by removing or attenuating the first analog signal from a signal formed by combining the first analog signal and the third analog signal.

2. The filter coefficient setting apparatus of claim 1, wherein
  the response signal acquiring unit acquires the second response signal by generating a second signal, adjusts the magnitude of the second response signal in response to the magnitude of the second response signal, and acquires again the second response signal, and wherein
  the filter coefficient setting unit sets the filter coefficients of the first Finite Impulse Response filter based on the second response signal acquired again.

3. The filter coefficient setting apparatus of claim 1, wherein
  the signal level adjusting unit adjusts the signal levels of the second and the third digital signals based on the amount by which the level of the first signal is to be adjusted and, thereby, the fourth analog signal is a signal obtained by removing or attenuating the first analog signal from a signal formed by combining the first analog signal and the third analog signal.

4. The filter coefficient setting apparatus of claim 3, wherein
  the filter coefficient setting unit sets a phase-inverted signal of the second response signal as the filter coefficients of the first Finite Impulse Response filter, wherein
  the response signal acquiring unit acquires the first response signal employing the magnitude of the second signal that is employed when the second response signal is acquired as the magnitude of the first signal, adjusts the magnitude of the first signal in response to the magnitude of the first response signal, and acquires again the first response signal, wherein
  the filter coefficient setting unit sets the first response signal acquired again as the filter coefficients of the second Finite Impulse Response filter, and wherein
  the signal level adjusting unit adjusts the signal level of the second or the third digital signal based on the amount by which the first signal is to be adjusted.

5. The filter coefficient setting apparatus of claim 3, wherein
  the filter coefficient setting unit sets the second response signal as the filter coefficients of the first Finite Impulse Response filter, wherein
  the response signal acquiring unit acquires the first response signal employing the magnitude of the second signal that is employed when the second response signal is acquired as the magnitude of the first signal, adjusts the magnitude of the first signal in response to the magnitude of the first response signal, and acquires again the first response signal, wherein
  the filter coefficient setting unit sets a phase-inverted signal of the first response signal acquired again as the filter coefficients of the second Finite Impulse Response filter, and wherein
  the signal level adjusting unit adjusts the signal level of the second or the third digital signal based on the amount by which the first signal is to be adjusted.

6. The filter coefficient setting apparatus of claim 2, wherein
  the signal level adjusting unit adjusts the signal levels of the second or the third digital signals based on the amount by which the level of the second signal is to be adjusted and, thereby, the fourth analog signal is a signal obtained by removing or attenuating the first analog signal from a signal formed by combining the first analog signal and the third analog signal.

7. The filter coefficient setting apparatus of claim 6, wherein
  the filter coefficient setting unit sets a phase-inverted signal of the first response signal as the filter coefficients of the second Finite Impulse Response filter, wherein
  the response signal acquiring unit acquires the second response signal employing the magnitude of the first signal that is employed when the first response signal is acquired as the magnitude of the second signal, adjusts the magnitude of the second signal in response to the magnitude of the second response signal, and acquires again the second response signal, wherein
  the filter coefficient setting unit sets the second response signal acquired again as the filter coefficients of the first Finite Impulse Response filter, and wherein the signal level adjusting unit adjusts the signal level of the second or the third digital signal based on the amount by which the second signal is to be adjusted.

8. The filter coefficient setting apparatus of claim 6, wherein
the filter coefficient setting unit sets the first response signal as the filter coefficients of the second Finite Impulse Response filter, wherein
the response signal acquiring unit acquires the second response signal employing the magnitude of the first signal that is employed when the first response signal is acquired as the magnitude of the second signal, adjusts the magnitude of the second signal in response to the magnitude of the second response signal, and acquires again the second response signal, wherein
the filter coefficient setting unit sets a phase-inverted signal of the second response signal acquired again as the filter coefficients of the first Finite Impulse Response filter, and wherein
the signal level adjusting unit adjusts the signal level of the second or the third digital signal based on the amount by which the second signal is to be adjusted.

9. The filter coefficient setting apparatus of claim 1, wherein
the signal level adjusting unit varies the first response signal acquired again based on the amount by which the first signal is to be adjusted, and wherein
the filter coefficient setting unit sets the varied first response signal as the filter coefficients of the second Finite Impulse Response filter and, thereby, causes the fourth analog signal to be a signal obtained by removing or attenuating the first analog signal from a signal formed by combining the first analog signal and the third analog signal.

10. The filter coefficient setting apparatus of claim 9, wherein
the filter coefficient setting unit sets a phase-inverted signal of the second response signal as the filter coefficients of the first Finite Impulse Response filter, wherein
the response signal acquiring unit acquires the first response signal employing the magnitude of the second signal that is employed when the second response signal is acquired as the magnitude of the first signal, adjusts the magnitude of the first signal in response to the magnitude of the first response signal, and acquires again the first response signal, wherein
the signal level adjusting unit varies the first response signal acquired again based on the amount by which the first signal is to be adjusted, and wherein
the filter coefficient setting unit sets the varied first response signal as the filter coefficients of the second Finite Impulse Response filter.

11. The filter coefficient setting apparatus of claim 9, wherein
the filter coefficient setting unit sets the second response signal as the filter coefficients of the first Finite Impulse Response filter, wherein
the response signal acquiring unit acquires the first response signal employing the magnitude of the second signal that is employed when the second response signal is acquired as the magnitude of the first signal, adjusts the magnitude of the first signal in response to the magnitude of the first response signal, and acquires again the first response signal, wherein
the signal level adjusting unit varies the first response signal acquired again based on the amount by which the first signal is to be adjusted, and wherein the filter coefficient setting unit sets a phase-inverted signal of the varied response signal as the filter coefficients of the second Finite Impulse Response filter.

12. The filter coefficient setting apparatus of claim 2, wherein
the signal level adjusting unit varies the second response signal acquired again based on the amount by which the second signal is to be adjusted, and wherein
the filter coefficient setting unit sets the varied second response signal as the filter coefficients of the first Finite Impulse Response filter and, thereby, causes the fourth analog signal to be a signal obtained by removing or attenuating the first analog signal from a signal formed by combining the first analog signal and the third analog signal.

13. The filter coefficient setting apparatus of claim 12, wherein
the filter coefficient setting unit sets a phase-inverted signal of the first response signal as the filter coefficients of the second Finite Impulse Response filter, wherein
the response signal acquiring unit acquires the second response signal employing the magnitude of the first signal that is employed when the first response signal is acquired as the magnitude of the second signal, adjusts the magnitude of the second signal in response to the magnitude of the second response signal, and acquires again the second response signal, wherein
the signal level adjusting unit varies the second response signal acquired again based on the amount by which the second signal is to be adjusted, and wherein
the filter coefficient setting unit sets the varied second response signal as the filter coefficients of the first Finite Impulse Response filter.

14. The filter coefficient setting apparatus of claim 12, wherein
the filter coefficient setting unit sets the first response signal as the filter coefficients of the second Finite Impulse Response filter, wherein
the response signal acquiring unit acquires the second response signal employing the magnitude of the first signal that is employed when the first response signal is acquired as the magnitude of the second signal, adjusts the magnitude of the second signal in response to the magnitude of the second response signal, and acquires again the second response signal, wherein
the signal level adjusting unit varies the second response signal acquired again based on the amount by which the second signal is to be adjusted, and wherein
the filter coefficient setting unit sets a phase-inverted signal of the varied second response signal as the filter coefficients of the first Finite Impulse Response filter.

15. The filter coefficient setting apparatus of claim 2, wherein
the response signal acquiring unit varies the magnitude of the first signal or the second signal at once such that the level of the first or the second response signal is equal to or larger than a predetermined level when the magnitude of the first or the second response signal is smaller than the predetermined level.

16. The filter coefficient setting apparatus of claim 2, wherein
the response signal acquiring unit reduces stepwise the first signal or the second signal until the first or the second response signal is equal to or smaller than a predetermined level when the magnitude of the first or the second response signal is larger than the predetermined level.

17. A filter coefficient setting method of an echo preventing circuit having
- a first Finite Impulse Response filter that is inputted with a first digital signal and that outputs a second digital signal,
- a second Finite Impulse Response filter that is inputted with the first digital signal at the same time that the first Finite Impulse Response filter is inputted with the first digital signal, and that outputs a third digital signal,
- a first DA converter that converts the second digital signal into a first analog signal and outputs the first analog signal,
- a second DA converter that converts the third digital signal into a second analog signal and outputs the second analog signal,
- an input/output terminal that outputs the first analog signal or that is inputted with a third analog signal,
- a subtracting circuit that outputs a fourth analog signal obtained by subtracting the second analog signal from a signal formed by combining the first analog signal and the third analog signal, and
- an AD converter that converts the analog signal outputted from the subtracting circuit into a digital signal and outputs the digital signal, the method comprising the steps of:
- acquiring a first response signal of a section from an output of the first Finite Impulse Response filter to an output of the AD converter by generating a first signal;
- adjusting the magnitude of the first signal in response to the magnitude of the first response signal;
- acquiring again the first response signal;
- setting the filter coefficients of the second Finite Impulse Response filter based on the first response signal acquired again;
- setting the filter coefficients of the first Finite Impulse Response filter based on a second response signal of a section from an output of the second Finite Impulse Response filter to an output of the AD converter; and
- adjusting the signal levels of the first and the second analog signals based on the amount by which the level of the first signal is to be adjusted such that the fourth analog signal is a signal obtained by removing or attenuating the first analog signal from a signal formed by combining the first analog signal and the third analog signal.

18. The filter coefficient setting method of claim 17, comprising the steps of:
- acquiring the second response signal by generating a second signal;
- adjusting the magnitude of the second signal in response to the magnitude of the second response signal and acquiring again the second response signal; and
- setting the filter coefficients of the first Finite Impulse Response filter based on the second response signal acquired again.

19. A recording medium having recorded thereon a program to set filter coefficients of an echo preventing circuit having
- a processor,
- a first Finite Impulse Response filter that is inputted with a first digital signal and that outputs a second digital signal,
- a second Finite Impulse Response filter that is inputted with the first digital signal at the same time that the first Finite Impulse Response filter is inputted with the first digital signal, and that outputs a third digital signal,
- a first DA converter that converts the second digital signal into a first analog signal and outputs the first analog signal,
- a second DA converter that converts the third digital signal into a second analog signal and outputs the second analog signal,
- an input/output terminal that outputs the first analog signal or that is inputted with the third analog signal,
- a subtracting circuit that outputs a fourth analog signal obtained by subtracting the second analog signal from a signal formed by combining the first analog signal and the third analog signal, and
- an AD converter that converts the analog signal outputted from the subtracting circuit into a digital signal and outputs the digital signal, the program being operable to cause the processor to implement the functions of:
- acquiring a first response signal of a section from an output of the first Finite Impulse Response filter to the AD converter by generating a first signal;
- adjusting the magnitude of the first signal in response to the magnitude of the first response signal and acquiring again the first response signal;
- setting the filter coefficients of the second Finite Impulse Response filter based on the first response signal acquired again and setting the filter coefficients of the first Finite Impulse Response filter based on a second response signal of a section from an output of the second Finite Impulse Response filter to an output of the AD converter; and
- adjusting the signal levels of the first and the second analog signals based on the amount by which the level of the first signal is to be adjusted such that the fourth analog signal is a signal obtained by removing or attenuating the first analog signal from a signal formed by combining the first analog signal and the third analog signal.

20. The recording medium recorded with a program of claim 19, wherein the program is operable to cause the processor to implement the functions of:
- acquiring the second response signal by generating a second signal;
- adjusting the magnitude of the second signal in response to the magnitude of the second response signal and acquiring again the second response signal; and
- setting the second response signal acquired again as the filter coefficients of the first Finite Impulse Response filter.

* * * * *